United States Patent Office 3,851,016
Patented Nov. 26, 1974

---

3,851,016
PROCESS FOR THE PRODUCTION OF TRANSPARENT, IMPACT-RESISTANT POLYMERS OF VINYL CHLORIDE
René Nicolet and Walter Gutmann, Fribourg, Switzerland, assignors to Lonza Ltd., Basel, Switzerland
No Drawing. Filed June 30, 1972, Ser. No. 267,984
Claims priority, application Switzerland, July 1, 1971, 9,724/71
Int. Cl. C08f 15/26
U.S. Cl. 260—884
14 Claims

ABSTRACT OF THE DISCLOSURE

A process as provided for the production of transparent impact-resistant, weather resistant polymers of vinyl chloride by the polymerization of vinyl chloride, according to the emulsion polymerization process in the presence of polymers of acrylic esters. The process comprises polymerizing the vinyl chloride in the presence of 2 to 10 percent by weight of a polymer of a 2-ethylhexyl acrylate containing at least 50 percent by weight of 2-ethylhexyl acrylate at a temperature of 50 to 70° C. and under absolute pressures amounting to 65 to 99 percent of the saturation pressure of the vinyl chloride at the appropriate polymerization temperature and under the conditions of the emulsion polymerization. The maximum average and minimum average particles diameters of the polymer of 2-ethylhexyl acrylate are preferably selected according to the following equations: maximum average particle diameter in $m\mu = 310 - (24$ times the concentration of the polymer of the 2-ethylhexyl acrylate in percent by weight); minimum average particle diameter in $m\mu = 33 - (3.3$ times the concentration of the polymer of 2-ethylhexyl acrylate in percent by weight). The process is preferably carried out under an absolute pressure amounting to 75 to 99 percent of the saturation pressure of vinyl chloride at the appropriate polymerization temperature and under the conditions of the emulsion polymerization.

FIELD OF INVENTION

This invention relates to a process for the production of transparent, impact-resistant, weather-resistant polymers of vinyl chloride by the emulsion polymerization of vinyl chloride in the presence of pre-formed polyacrylate dispersions.

OTHER APPLICATIONS

This application is referred to and incorporates the disclosure of application Ser. No. 162,346, filed July 14, 1971.

BACKGROUND

Various processes for the production of impact-resistant polyvinyl chloride are known. According to U.S. Pat. No. 3,019,208, for example, vinyl chloride is grafted according to an emulsion polymerization process onto a polyacrylic acid ester containing 1–10 carbon atoms in the alcohol radical with the use of water-soluble catalysts, amounts of 10 to 50 percent by weight of polyacrylates being required in order to achieve an improvement of impact strength. The disadvantage of the use of such large amounts of lower polyacrylates consists of the reduction of the softening point. In order to obviate these disadvantages, the emulsion polymerization of the vinyl chloride is carried out according to German Auslegeschrift No. 1,206,589 in the presence of an emulsion of polyacrylic acid tridecyl ester which may also be used in smaller amounts.

Besides these emulsion polymerization processes, there are also known polymerization processes in suspension where vinyl chloride is polymerized in an aqueous suspension with the aid of suspension stabilizers in the presence of emulsions of polymers which are tough-elastic at room temperature. Suitable viscous-elastic polymers are *inter alia*, polymers of acrylates, especially polyacrylic acid butyl ester.

The disadvantage of all polyvinyl chlorides modified according to these known processes is mainly that the transparency is substantially diminished. Another disadvantage which is particularly inconvenient in transparent products is "white fracture"; this means that white spots appear when the material is bent or knocked, for example, when building plates are nailed or when hail hits an external wall or roof tiles.

With a few exceptions, all known processes for the polymerization of vinyl chlorides in emulsion are carried out at the saturation pressure of the vinyl chloride, i.e. in the presence of liquid vinyl chloride. It is well known that polymerization carried out below the saturation pressure of vinyl chloride leads to lower molecular weights or K-values (Swiss Pat. No. 295,067) or to lower relative viscosities (German Pat. No. 829,063, 39 c., 25/01; U.S. Pat. No. 3,107,237).

On the other hand, it was not known and not to be expected from the start that the optical and processing properties can be influenced while the viscosimetric molecular weights remain constant.

SUMMARY OF INVENTION

It has now been found according to various objects of the invention that excellent impact and weather resistance can be attained and transparency be substantially improved and that products without white fracture are obtained when the polymerization of the vinyl chloride is carried out in the presence of 2-ethylhexyl acrylate under pressures which are below the saturation pressure of vinyl chloride at the corresponding polymerization temperature. Another surprising effect is found in that these products are more easily processed. This is noticeable, for example, in that the absorption of energy is comparatively low when the products are worked up in a Brabender plastograph.

DETAILED DESCRIPTION

The process according to the invention for the production of transparent, impact-resistant, weather-resistant polymers of vinyl chloride by the polymerization of vinyl chloride according to the emulsion polymerization process in the presence of polymers of acrylic acid esters is characterized in that vinyl chloride is polymerized in the presence of 2 to 10 percent by weight, preferably 4 to 9 percent by weight, of a polymer of 2-ethylhexyl acrylate containing at least 50 percent by weight 2-ethylhexyl acrylate, at temperatures of 50 to 70° C. and under absolute pressures which amount to 65 to 99 percent of the saturation pressure of vinyl chloride at the appropriate polymerization temperature.

The process is preferably carried out under absolute pressures which amount to 75 to 99 percent of the saturation pressure of vinyl chloride at the appropriate polymerization temperature.

The saturation pressure of vinyl chloride here means the absolute pressure which would adjust itself in the reaction chamber in the presence of liquid vinyl chloride and of polymerization auxiliaries, including water, at the appropriate polymerization temperature.

There are preferably used polymers of 2-ethylhexyl acrylate the maximum average and minimum average particle diameters are calculated as a function of the concentration of the polymer of 2-ethylhexyl acrylate in the polymer of the vinyl chloride, according to the following equation: maximum average particle diameter in mµ=310—(24 times the concentration of the polymer of 2-ethylhexyl acrylate in percent by weight); minimum average particle diameter in mµ=33—(3.3 times the concentration of the polymer of 2-ethylhexyl acrylate in percent by weight).

In the preferred range of particle diameters of the polymers of 2-ethylhexyl acrylate there are obtained polymers which are characterized not only by their good impact strength but also by an improved transparency. An outstanding transparency is achieved in an embodiment of the invention which is particularly preferred by using particle diameters in the range between the formula for the maximum average particle diameter in mµ=260—(24 times the concentration of the polymer of 2-ethylhexyl acrylate in percent by weight) and the minimum average particle diameter in mµ=33—(3.3 times the concentration of the polymer of 2-ethylhexyl acrylate in percent by weight).

For a concentration of 9 percent by weight poly-2-ethylhexyl acrylate in the polymer of vinyl chloride there results, according to the formulae, a maximum average diameter of the poly-2-ethylhexyl acrylate particles of 94 mµ and a minimum average diameter of 1.5 mµ, preferably an average diameter of maximally 44 mµ to minimally 1.5 mµ. The following values result at a concentration of 5.5 percent by weight: average diameter maximum 178 mµ and average diameter minimum 14 mµ, preferably maximum 128 mµ to minimum 14 mµ.

It is expedient to use a polymer of 2-ethylhexyl acrylate which contains more than 90 percent by weight 2-ethylhexyl acrylate.

As co-monomers there are used lower acrylates, for example, methyl, ethyl, propyl, isopropyl, butyl, isobutyl and hexyl acrylate.

The polymers of 2-ethylhexyl acrylate used for the application of the process according to the invention are preferably used in the form of aqueous dispersions. They can be prepared by the emulsion polymerization of 2-ethylhexyl acrylate, optionally together with lower acrylates as co-monomers in the presence of water-soluble initiators and of emulsiers. The average particle diameter of the resultant polymers of 2-ethylhexyl acrylate is determined in known manner by the conditions of the emulsion polymerization.

Polyacrylate dispersions of different average particle diameters can be prepared, for example, by varying the amount of emulsifier used. As emulsifiers there are mainly used salts of fatty acids with a chain length of 12 to 18 carbon atoms. The alkali metal or ammonium salts of lauric acid, myristic acid, oleic acid, coconut fatty acid, palmitic acid, stearic acid, and the like, are preferred. These emulsifiers are expediently used in amounts of 2 to 12 percent by weight, referred to the monomeric acrylate. If, for example, the emulsion polymerization of the 2-ethylhexyl acrylate is carried out in the presence of 2 percent by weight sodium laurate as emulsifier, then the average particle diameter of the polyacrylate amounts to about 139 mµ. If, however, 6 percent by weight sodium laurate are used, an average particle diameter of about 47 mµ is obtained.

Another possibility of influencing the particle diameters of the polymers of 2-ethylhexyl acrylate consists of the method of adding the monomeric acrylate and/or the emulsifier. If, for example, 3 percent by weight sodium laurate are used at the start and a further 3 percent by weight are added in the course of the reaction, then the average particle diameter amounts to about 72 mµ as against 47 mµ when the whole amount of emulsifier is used from the start.

When polyacrylate dispersions with a coarser average particle diameter are desired, the polymerization of the monomeric 2-ethylhexyl acrylate can be carried out in the presence of a pre-formed latex of the polyacrylate. In this case, the polymerization conditions are so chosen that the initial polymer particles continue to grow without the formation of new particles.

In principle, the average particle diameter can be determined with the aid of various methods, such as measuring the light scattering, with the aid of a disc centrifuge or by electron microscopy. In the last-mentioned case there is a risk that the polymer particles, due to their low softening temperature, are so strongly modified by agglomeration or melting together during the preparation of the samples and/or during measuring that reliable determination is no longer possible.

Soap titration has proved particularly suitable because of its simplicity. This method is known and has been used by several authors (Houben-Weyl XIV/L, p. 369). It is based on the determination of the specific particle surface of the dispersion under investigation. If $d$ is the average particle diameter in mµ and $E$ is the amount of emulsifier required for covering 1 g. of the polymer with a layer of monomolecular emulsifier, and if the density of the polyacrylate is set as 1.00, then the relation $$d = \frac{9.4}{E}$$

results for the titration with mersolate K 30 [according to Jacobi, Angew. Chem. 64, 539–543 (1952)].

The polymerization of the vinyl chloride is carried out in an aqueous emulsion.

As emulsifiers, there are mainly used salts of fatty acids with a chain length of 12–18 carbon atoms. The alkali metal or ammonium salts of lauric acid, myristic acid, oleic acid, coconut fatty acid, palmitic acid, and stearic acid, and the like, are preferred. These emulsifiers are expediently used in amounts of 0.05 to 1%, referred to the vinyl chloride.

As catalysts, there are used water-soluble radical formers, such as peroxides, persulphates, azo compounds, and redox compounds. The advantageous amount is 0.05 to 0.5 percent by weight, referred to the vinyl chloride.

The polymerization can be carried out in the presence of polymerization regulators. As polymerization regulators, there are used mercaptans and saturated or unsaturated halogenated hydrocarbons. The amount of regulator depends on its type and on the K-value to be adjusted. Dodecyl-mercaptan, for example, is used in amounts of 0.01 to 0.2 percent by weight, referred to the vinyl chloride. Trichloroethylene, 1,2-dichloroethylene or bromoform are used in amounts of 0.1 to 5 percent. The K-value of the vinyl chloride polymers obtained should advantageously amount to about 60 to 75.

The polymerization is expediently carried out by placing the aqueous dispersion of the 2-ethylhexyl acrylate polymer together with the catalyst, the emulsifier and possibly the regulator into a pressure vessel which permits of mixing, for example, a pressure vessel fitted with stirrer, and then feeding the monomeric vinyl chloride in such an amount that the prescribed working pressure, which lies below the saturation pressure of the vinyl chloride at the given temperature, is achieved and maintained.

The working pressure amounts to 65 to 99 percent, preferably 75 to 99 percent, of the saturation pressure of vinyl chloride at the appropriate polymerization temperature. The monomeric vinyl chloride is partly dissolved in the aqueous phase, partly absorbed in the polymer already formed and, lastly, it is in the gaseous state, but at no time is it present in the reaction vessel in the liquid state.

The prescribed working pressure is maintained by the continuous or almost continuous addition of vinyl chloride as and when it is used up by the polymerization. The supply of vinyl chloride can be carried out, for example, by connecting the gas space of the polymerization vessel to the gas chamber of a storage tank where monomeric vinyl chloride to which a non-volatile polymerization inhibitor may have been added is kept at such a temperature that the pressure generated exactly suffices to adjust the prescribed working pressure in the reaction chamber. The vinyl chloride may also be continuously added in the liquid form by pumping. In a preferred embodiment of the invention, liquid vinyl chloride is added in small portions so that the pressure in the reaction chamber remains almost constant; i.e., that it fluctuates by less than 0.2 at excess pressure around the prescribed value. Because of the reduced pressure prevailing in the reaction chamber, the added liquid vinyl chloride will evaporate as soon at is arrives in the reaction chamber so that no vinyl chloride can reach the polymerization centers in the liquid form.

When the polymerization is completed, the polymer is worked up by known methods such as, for example, by coagulation with the addition of electrolytes, separation from the polymerization serum by centrifuging, washing, and drying in a drum drier or by spray-drying or by spraying onto roller driers.

The polyvinyl chloride products obtained according to the invention have throughout a better transparency than the corresponding products prepared according to conventional methods in the presence of liquid vinyl chloride. For example, the haze can be reduced by 50 to more than 80% of the original value, depending on the polymerization conditions. Moreover, 1 mm.-plates can be bent to and fro by 180° several times without showing a trace of white fracture. Finally, it is also found that, although the K-values according to Fikentscher are usually higher, the torque measured in the Brabender plastograph is lower than or not more than equal to that of the corresponding known products.

Due to their excellent impact strength, transparency and weather resistance, the polymers according to the invention can be used for the production of transparent or translucent products such as plates, tubes, profiles and so forth by extrusion, injection-molding, calendering etc. and yield valuable building materials.

The invention will next be further elucidated with the following examples:

EXAMPLE 1

4900 g. of desalted water, 90 g. lauric acid, 45 ml. of a 10 N sodium hydroxide solution 5 g. potassium peroxide disulphate were introduced into a stirrer-autoclave of stainless steel with a capacity of 12 litres, and the material was heated to 55° C. while stirring. The autoclave was evacuated and rinsed by repeatedly pressing in oxygen-free nitrogen and evacuating; finally, nitrogen was pressed in until the pressure amounted to 2 at. excess pressure.

At an autoclave temperature of 55° C., 100 g. 2-ethylhexyl acrylate were pumped in within 2 minutes, and after 5 minutes, 1900 g. 2-ethylhexyl acrylate were continuously added in the course of 150 minutes. After a total reaction time of 4 hours, the content of the autoclave was released and cooled. A thinly liquid dispersion with a solids content of 28.5% was obtained. The average particle diameter was determined by 45 m$\mu$ by soap titration.

Various tests were then carried out at different working pressure and temperatures; the following procedure was adopted:

5470 g. of desalted water, 4 g. lauric acid, 25 ml. of a 1 N sodium hydroxide solution, 2.5 to 5 g. potassium peroxide disulphate (depending on the polymerization temperature), and 600 g. of the above preliminary dispersion containing 172 g. poly-2-ethyl hexylacrylate were introduced with stirring at 50° C. into a stirrer-autoclave of stainless steel with 12 litres capacity, and heated to the polymerization temperature according to Table 1. The autoclave was evacuated and rinsed by repeatedly pressing in vinyl chloride and releasing. Vinyl chloride was added until the predetermined polymerization pressure according to Table 1 was reached, and further vinyl chloride was pumped in at an almost constant pressure in portions of 10 to 20 g. After the consumption of a total of 1830 g. vinyl chloride, the mixture was allowed to react until the pressure amounted to about 4 at excess pressure, the unreacted vinyl chloride was released, and the material cooled. The dispersions contained about 24 percent by weight of solids. The polymers were isolated in the usual way by coagulation with electrolytes.

In another test, 20 g. trichloroethylene were also added to the mixture prior to the vinyl chloride.

The comparative tests were carried out under the saturation pressure of the vinyl chloride at the corresponding polymerization temperature. The above mixture was used for this purpose, with the difference that all of the vinyl chloride was added from the start.

By rolling mixtures of 60.5 parts by weight of vinyl chloride polymer, 1 part by weight of an organic thio-tin stabilizer and 1 part by weight of a lubricant at 180° C. for 10 minutes on mixing rolls and pressing at 180° C. there were produced plates 1 mm. and 4 mm. thickness. The notched impact strength of small standard rods was measured according to DIN 53453, the Vicat softening point according to DIN 53460. The haze was measured with the aid of the haze meter of the firm Evans Electroselenium Ltd., of Halstead (England) according to ASTM D-1003-61. The term "haze" or cloudiness designates the proportion between the light Td which is scattered while passing through the sample and the non-scattered transmitted light Tt. The value is expressed in percent:

$$\text{haze} = \frac{Td}{Tt} \cdot 100 \text{ (percent)}$$

For testing the processing properties, a mixture of 57 parts by weight vinyl chloride polymer, 2.3 parts by weight of a barium-cadmium stabilizer and 0.7 parts by weight of a lubricant were kneaded in a measuring kneader, type W–50, of a plastograph, type PL 3 S, of the firm Brabender, of Duisburg (Germany), at 180° C. and 40 r.p.m. As a measure of the workability, there was taken the lowest torque (in k.p.m.) which was reached after gelling and which depends on the melting viscosity.

The K-value according to Fikentscher was determined on 1 percent solutions in cyclohexanone at 20° C. The acrylate content was indirectly calculated from the chlorine content.

The polymerization conditions and the results obtained are listed in the following Table 1.

The polymers 1 to 6 obtained according to the invention show no white fracture whereas the control products A to D show a very strong white fracture.

TABLE 1

| Test number | Temperature, °C. | Pressure at exc. press. | K-value | EHA, percent in VC-polymer | Haze (1 mm. plate) percent | Notched impact strength, kp-cm./cm.² | Brabender torque, kp.m. | Vicat softening point |
|---|---|---|---|---|---|---|---|---|
| 1 | 59 | 8.0 | 72.2 | 9.8 | 9 | 18.7 | 3.0 | 72 |
| 2 | 59 | 7.0 | 72.4 | 9.5 | 6 | 25.3 | 2.9 | 72 |
| Control A | 59 | ª 9.1 | 69.4 | 9.2 | 35 | 27.4 | 3.3 | 74 |
| 3 | 53 | 7.0 | 78.1 | 9.0 | 9 | 27.5 | 3.6 | 74 |
| Control B | 53 | ª 8.0 | 71.7 | 9.4 | 15 | 21.5 | 3.9 | 75 |
| 4 | 67 | 10.0 | 65.6 | 10.0 | 12 | 17.5 | 2.5 | 72 |
| Control C | 67 | ª 11.3 | 62.1 | 10.0 | 41 | 20.7 | 2.6 | 74 |
| 5 ᵇ | 59 | 8.0 | 60.2 | 10.0 | 28 | 15.2 | 2.2 | 72 |
| Control D | 59 | ª 9.1 | 60.9 | 10.0 | 54 | 26.9 | 2.3 | 74 |

ª Saturation pressure.   ᵇ 20 g. trichloroethylene at the start.

EXAMPLE 2

The experiment 2 of Example 1 was repeated, but with the difference that the mixture consisted, in a first case, of 5650 g. of desalted water, 6 g. lauric acid, 35 ml. of a 1 N sodium hydroxide solution, 5 g. potassium peroxide disulphate, 450 g. of a preliminary polyacrylate dispersion (corresponding to 128 g. poly-2-ethylhexyl acrylate) and 1870 g. vinyl chloride and, in a second case, of 5710 g. of desalted water, 7.5 g. lauric acid, 40 ml. of a 1 N sodium hydroxide solution, 5 g. potassium peroxide disulphate, 350 g. of a preliminary polyacrylate dispersion (corresponding to 100 g. poly-2-ethylhexyl acrylate) and 1900 g. vinyl chloride. The polymerization conditions and the results obtained are listed in Table 2.

TABLE 2

| Test number | Temperature, °C. | Pressure at exc. press. | K-value | EHA, percent in VC-polymer | Haze (1 mm. plate) percent | Notched impact strength, kp-cm./cm.² | Brabender torque, kp.m. | Vicat softening point |
|---|---|---|---|---|---|---|---|---|
| 7 | 59 | 8.0 | 69.5 | 5.8 | 5 | 5.8 | 2.9 | 72 |
| Control E | 59 | a 9.1 | 67.4 | 5.6 | 16 | 8.8 | 3.2 | 75 |
| 8 | 59 | 8.0 | 72.2 | 8.4 | 7 | 11.1 | 3.0 | 73 |
| Control F | 59 | a 9.1 | 69.5 | 7.7 | 22 | 21.1 | 3.3 | 74 | a Saturation pressure.

By polymerization under a pressure amounting to about 90% of the saturation pressure of vinyl chloride at the polymerization temperature, the haze of the 1 mm. plate is reduced to about ⅓ of the value obtained by polymerization under the saturation pressure.

EXAMPLE 3

6000 g. of desalted water, 26 g. lauric acid, 13 ml. of a 10 N sodium hydroxide solution and 1000 g. 2-ethylhexyl acrylate were introduced at 50° C. into a stirrer-autoclave of stainless steel with 12 litres capacity, and heated with stirrings to 55° C. The autoclave was evacuated and rinsed by repeatedly pressing in oxygen-free nitrogen and evacuating. Finally, nitrogen was pressed in until the pressure amounted to 2 at. excess pressure. At an autoclave temperature of 55° C., 5 g. potassium peroxide disulphate were introduced in the form of a solution in 60 ml. of desalted water. After 4 hours, the content of the autoclave was released and cooled. A thinly liquid dispersion was obtained with a solids content of about 14% and an average particle diameter of 105 mµ determined by soap titration.

Another poly-2-ethylhexyl acrylate dispersion with an average particle diameter of about 150 mµ was prepared in the same way but with the difference that only 15 g. lauric acid and 7.5 ml. of the 10 N sodium hydroxide solution were used.

As in the experiment 2 of Example 1, 5100 g. of desalted water, 9 g. lauric acid, 50 ml. of a 1 N sodium hydroxide solution. 5 g. potassium peroxide disulphate and 980 g. of the above preliminary polyacrylate dispersions containing 140 g. poly-2-ethylhexyl acrylate, were introduced into the autoclave, and 1860 g. vinyl chloride were polymerized at 59° C. and 8.0 at excess pressure. The corresponding comparative tests were carried out by introducing the whole amount of vinyl chloride at the start of the polymerization. The results can be seen from Table 3.

TABLE 3

| Test number | Temperature, °C. | Pressure at exc. press. | K-value | EHA, percent in VC-polymer | Haze (1 mm. plate) percent | Notched impact strength, kp-cm./cm.² | Brabender torque, kp.m. | Vicat softening point |
|---|---|---|---|---|---|---|---|---|
| 9 | 59 | 8.0 | 72.8 | 7.8 | 22 | 30.7 | 3.0 | 73 |
| Control G | 59 | a 9.1 | 70.6 | 8.6 | 37 | 31.1 | 3.4 | 75 |
| 10 | 59 | 8.0 | 74.5 | 7.5 | 35 | 29.1 | 3.1 | 73 |
| Control H | 59 | a 9.1 | 68.3 | 7.1 | 58 | 23.4 | 3.3 | 74 | a Saturation pressure.

EXAMPLE 4

1130 g. of desalted water, 12 g. lauric acid, 60 ml. of a 1 N sodium hydroxide solution and 2 g. potassium peroxide disulphate were introduced into a flask of 2 litres capacity fitted with gas feed tube, reflux condenser, dropping funnel, thermometer and stirrer, and heated to the polymerization temperature of 55° C. A nitrogen current was blown through the mixture from the start of the heating until the end of the reaction. At 55° C., there were added 50 g. of a mixture of 200 g. 2-ethylhexyl acrylate, 80 g. butyl acrylate and 0.1 g. tert.-dodecyl-mercaptan. When the polymerization had started, the remaining monomer mixture was added dropwise in the course of one hour. The mixture was subsequently allowed to react for a further 2 hours. 1480 g. of an approximately 19% dispersion were obtained.

After 5340 g. of desalted water, 5 g. lauric acid, 30 ml. of a 1 N sodium hydroxide solution and 900 g. of the above dispersion corresponding to 170 g. of acrylate copolymer had been introduced into a stirrer autoclave of 12 litres capacity, 1830 g. vinyl chloride were polymerized as in Example 1 at 59° C. and 8.0 at. excess pressure. A corresponding comparative test was carried out by introducing the whole amount of vinyl chloride at the start of the reaction.

The results are given in Table 4.

TABLE 4

| Test number | Temperature, °C. | Pressure at exc. press. | K-value | EHA, percent in VC-polymer | Haze (1 mm. plate) percent | Notched impact strength, kp-cm./cm.² | Brabender torque, kp.m. | Vicat softening point |
|---|---|---|---|---|---|---|---|---|
| 11 | 59 | 8.0 | 74.3 | 8.5 | 6 | 8.9 | 3.1 | 72 |
| Control J | 59 | a 9.1 | 71.9 | 9.4 | 17 | 32.6 | 3.3 | 75 | a Saturation pressure.

The highest content of 1-ethylhexyl acrylate is present when pure ethylhexyl acrylate is used as pre-polymer. Also, a co-polymer with other acrylates can naturally be used, whereat the proportion of ethylhexyl acrylate should be at least 50 percentage of the weight.

The advantages here as compared with earlier patent application Ser. No. 162,346 consists of the fact that a product is procured which shows no "white fracture," better transparency and can be more easily processed. This is shown in the various tables, whereat transparency can be taken from the turbidity measurements and workability from the values of torsional moment (Brabender).

What is claimed is:

1. A process for the production of transparent, impact-resistance, weather-resistant polymers of vinyl chloride by the polymerization of vinyl chloride according to the emulsion polymerization process in the presence of polymers of acrylic acid esters, comprising polymerizing the vinyl chloride in the presence of 2 to 10 percent by weight of a polymer of 2-ethylhexylacrylate containing at least 50 percent by weight 2-ethylhexylacrylate at temperatures of 50 to 70° C. and under absolute pressures amounting to 65 to 99% of the saturation pressure of the vinyl chloride at the polymerization temperature and under the conditions of the emulsion polymerization, the maximum average and the minimum average particle diameters of the polymer of 2-ethylhexylacrylate being selected, as a function of the concentration of the polymer of 2-ethylhexylacrylate in the polymer of the vinyl chloride, according to the following equations:

maximum average particle diameter in $m\mu = 310 - (24$ times the concentration of the polymer of 2-ethylhexylacrylate in percent by weight);

minimum average particle diameter in $m\mu = 33 - (3.3$ times the concentration of the polymer of 2-ethylhexylacrylate in percent by weight).

2. A process as claimed in claim 1 wherein 4–9 percent by weight of polymer of the 2-ethylhexyl-acrylate are employed.

3. A process according to claim 1 wherein the process is carried out under an absolute pressure amounting to 75 to 99% of the saturation pressure of vinyl chloride at the appropriate polymerization temperature and under the conditions of the emulsion polymerization.

4. A process according to claim 1 wherein there is used a polymer of 2-ethylhexyl-acrylate the average particle diameter of which lies between the maximum particle diameter in $m\mu$ of 260—(24 times the concentration of the polymer of 2-ethylhexyl-acrylate in percent by weight) and the minimum particle diameter in $m\mu$ of 33—(3.3 times the concentration of the polymer of 2-ethylhexyl-acrylate in percent by weight).

5. A process according to claim 1 wherein there is used a polymer of 2-ethylhexyl-acrylate which contains more than 90 percent by weight of 2-ethylhexyl-acrylate units.

6. A process according to claim 1 wherein there is used a copolymer of 2-ethylhexyl-acrylate with acrylic acid esters the ester group of which contain 1 to 6 carbon atoms.

7. A process according to claim 1 wherein salts of fatty acids with 12 to 18 carbon atoms in the molecule are used as emulsifiers in amounts of 0.05 to 1 percent by weight, referred to the vinyl chloride.

8. A process according to claim 1 wherein the polymerization is carried out in the presence of polymerization regulators.

9. A process according to claim 1 wherein the process is carried out in the presence of mercaptans used as regulators in amounts of 0.01 to 0.2 percent by weight, referred to the vinyl chloride.

10. A process according to claim 1 wherein the process is carried out in the presence of saturated or unsaturated halogenated hydrocarbons used as regulators in amounts of 0.1 to 5 percent by weight, referred to the vinyl chloride.

11. A process according to claim 1 wherein water-soluble radical formers are used as catalysts.

12. A process according to claim 11 wherein the catalysts are selected from the group consisting of peroxides, persulphates, azo compounds, and redox compounds.

13. A process according to claim 7 wherein the emulsifiers are selected from the group consisting of alkali metal or ammonium salts of lauric acid, myristic acid, oleic acid, coconut fatty acid, palmitic acid, and stearic acid.

14. A process according to claim 1 wherein the polymerization of the 2-ethylhexyl-acrylate is carried out in the presence of a pre-formed latex of the polyacrylate.

References Cited

UNITED STATES PATENTS

| | | | |
|---|---|---|---|
| 3,019,208 | 1/1962 | Reid et al. | 260—45.5 |
| 3,548,034 | 12/1970 | Cleeman et al. | 260—884 |
| 3,334,156 | 8/1967 | Calentine et al. | 260—884 |
| 3,206,424 | 9/1965 | Heinrich et al. | 260—29.6 |
| 2,862,912 | 12/1958 | Ott | 260—78.5 |
| 2,899,405 | 8/1959 | Coover | 260—884 |

MURRAY TILLMAN, Primary Examiner

C. J. SECCURO, Assistant Examiner

U.S. Cl. X.R.

260—876 R